United States Patent
Sako et al.

(10) Patent No.: US 6,256,420 B1
(45) Date of Patent: *Jul. 3, 2001

(54) DATA TRANSMISSION SYSTEM

(75) Inventors: Yoichiro Sako, Chiba; Yuichi Kojima, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/415,249

(22) Filed: Apr. 4, 1995

Related U.S. Application Data

(63) Continuation of application No. 07/994,201, filed on Dec. 21, 1992, now abandoned.

(30) Foreign Application Priority Data

Dec. 24, 1991 (JP) ............................................... P03-357307

(51) Int. Cl.7 ............................... G06K 9/38; G06T 9/00
(52) U.S. Cl. .................. 382/239; 382/251; 375/240.05; 348/419.1
(58) Field of Search ................................... 382/172, 239, 382/251; 358/444, 261.4; 345/196, 201, 202; 348/405, 419, 419.1; 375/240.05, 240.03

(56) References Cited

U.S. PATENT DOCUMENTS

| | | | |
|---|---|---|---|
| 4,093,962 | * 6/1978 | Ishiguro et al. | 348/419.1 |
| 4,179,710 | * 12/1979 | Ishiguro et al. | 348/419.1 |
| 4,751,736 | 6/1988 | Gupta et al. | 704/230 |
| 5,025,482 | * 6/1991 | Murakami et al. | 382/239 |
| 5,029,019 | * 7/1991 | Yoshihara et al. | 358/444 |
| 5,029,112 | * 7/1991 | Sakamoto et al. | 345/418 |
| 5,038,209 | * 8/1991 | Haug | 375/240.05 |
| 5,136,283 | * 8/1992 | Nobs | 345/196 |
| 5,138,144 | * 8/1992 | Sakamoto | 358/444 |
| 5,144,426 | 9/1992 | Tanaka et al. | 375/240.13 |
| 5,151,941 | 9/1992 | Nishiguchi et al. | 704/233 |
| 5,159,447 | * 10/1992 | Haskell et al. | 375/240.05 |
| 5,164,828 | * 11/1992 | Tahara et al. | 375/240.05 |
| 5,301,242 | * 4/1994 | Gonzales et al. | 382/239 |
| 5,349,383 | 9/1994 | Parke et al. | 375/240.05 |
| 5,410,351 | 4/1995 | Kojima | 375/240.12 |
| 5,412,431 | 5/1995 | Vogel | 375/240.03 |
| 5,450,132 | * 9/1995 | Harris et al. | 375/240.05 |
| 5,606,539 | * 2/1997 | De Haan et al. | 375/240.05 |

FOREIGN PATENT DOCUMENTS

| | | | |
|---|---|---|---|
| 399-487 | 11/1990 | (EP) | H04N/7/13 |
| 57-125517 | 8/1982 | (JP) | H03K/13/02 |
| 63-110821 | 5/1988 | (JP) | H03M/3/04 |
| 2-202285 | 8/1990 | (JP) | H04N/7/13 |
| 3-129980 | 6/1991 | (JP) | H04N/7/13 |
| 3-255792 | 11/1991 | (JP) | H04N/7/133 |
| 5-41859 | 2/1993 | (JP) | H04N/7/13 |

* cited by examiner

Primary Examiner—Jon Chang
(74) Attorney, Agent, or Firm—Limbach & Limbach L.L.P.

(57) ABSTRACT

A transmission system which quantizes a data signal into quantized data and alternatively either transmits the quantized data while controlling a quantity of distortion to a constant value or transmits the quantized data while controlling a quantity of data generated to a constant value as a function of the quantized data which are alternatively stored in and read out from a first memory and a second memory.

6 Claims, 3 Drawing Sheets

DATA TRANSMISSION SYSTEM

This is a continuation of application Ser. No. 07/994,201 filed on Dec. 21, 1992 now abandonded.

FIELD OF THE INVENTION

This invention relates to a data transmission system, and more particularly to an improvement of transmitting picture data after compression thereof through a communication line or the like.

DESCRIPTION OF THE PRIOR ART

Conventionally, a data transmission system for transmitting picture data and audio data to remote places or recording these data in a digital system recording media, the picture data and the audio data are compressed by utilizing correlation between data thereof in order to obtain efficient transmission of picture data having large data quantities.

In the conventional data transmission apparatus, when the compressed picture data or audio data is quantized, the quantization size is controlled on the basis of the quantity of generated data of the transmission data in order to make the quantity of generated data substantially constant.

Thus, even when there is an allowance for the data transfer capacity, the picture data, such as a motion picture having a large quantity of generated data, is controlled such that the quantity of generated data thereof decreases, i.e., such that the quantization size thereof is rough. Consequently, the quantity of the transmission picture deteriorates, and the data transfer capability cannot thus be utilized effectively.

SUMMARY OF THE INVENTION

In view of the foregoing, an object of this invention is to provide a data transmission system which is capable of reliably transmitting data while maintaining the picture quality or audio quality substantially at a constant level regardless of a data source.

The foregoing object and other objects of the invention have been achieved by the provision of the present data transmission system. In the first aspect of the present invention, there is provided a data transmission system 1 for quantizing data signal S1 into quantized data S8 by means of a quantization means 13 and for transmitting the quantized data S8. A system control includes a constant distortion control means 32 for controlling the quantization means 13 so that the quantity of distortion is a constant value. The system control 17 also includes a variable distortion control means 33 for transmitting the quantized data S2 while controlling the quantization means so that the quantity of data generated is maintained at a constant value. The data transmission system 1 also includes first and second memory means 7 and 8 for alternately storing the quantized data S2, the quantized data S8 being written in one of the first and second memory means 7 and 8 while the coded quantized data S3 is being read out from the other memory means and transmitted. The system control 17 also includes change-over means 34 for changing control between control by the constant distortion control means 32 and control by the variable distortion control 33 means on the basis of the storage data S13 of the coded quantized data S2 which is written in the first and second memory means 7 and 8.

In the second aspect of the present invention, there is provided a data transmission system 1 for quantizing data signal S1 into quantized data S8 by means of a quantization means 13 and for transmitting the quantized data S8, which includes a system control 17 having a first control means for controlling quantization characteristics that are held to a constant value, and a second control means controlling the quantizing means 13 so that the quantization characteristics are varied. The data transmission system 1 also includes first and second memory means 7 and 8 for alternately storing the quantized data S8, the quantized data S2 being written in one of the first and second memory means 7 and 8 while the quantized data S3 being read out from the other memory means and transmitted. The system control 17 also includes change-over means 34 for changing over control between control by the first control means and control by the second control means on the basis of the storage data S13 of the quantized data S2 which is written in the first and second memory means 7 and 8.

Since transmission of data is changed over on the basis of the storage data of quantized data S2 which is written in first and second memory means 7 and 8 between transmission of the quantized data S2 by constant distortion transmission means 17 and transmission of the quantized data S2 by variable distortion transmission means 17, i.e., between transmission of the quantized data S2 obtained by controlling the quantization characteristics to constant characteristics and transmission of the quantized data S2 obtained by variably controlling the quantizing data S2, the transmission data can be transmitted with the quality thereof maintained to a constant quality regardless of the type of transmission data or transmission path.

In the data transmission system according to the present invention, digital data is obtained by the convention in which the transmission data is compressed and transmitted. Control of the quantizing means is changed over on the basis of the amount of stored data in the memory means so that the quantizing means quantizes the quantized data at constant distortion or variable distortion transmission of data, i.e., between quantization with constant quantization characteristics or quantization with variable quantization characteristics. It is possible therefore to transmit data while maintaining the quantity of the quantized data to be transmitted at a constant level regardless of the type of transmitted data or transmitted path.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
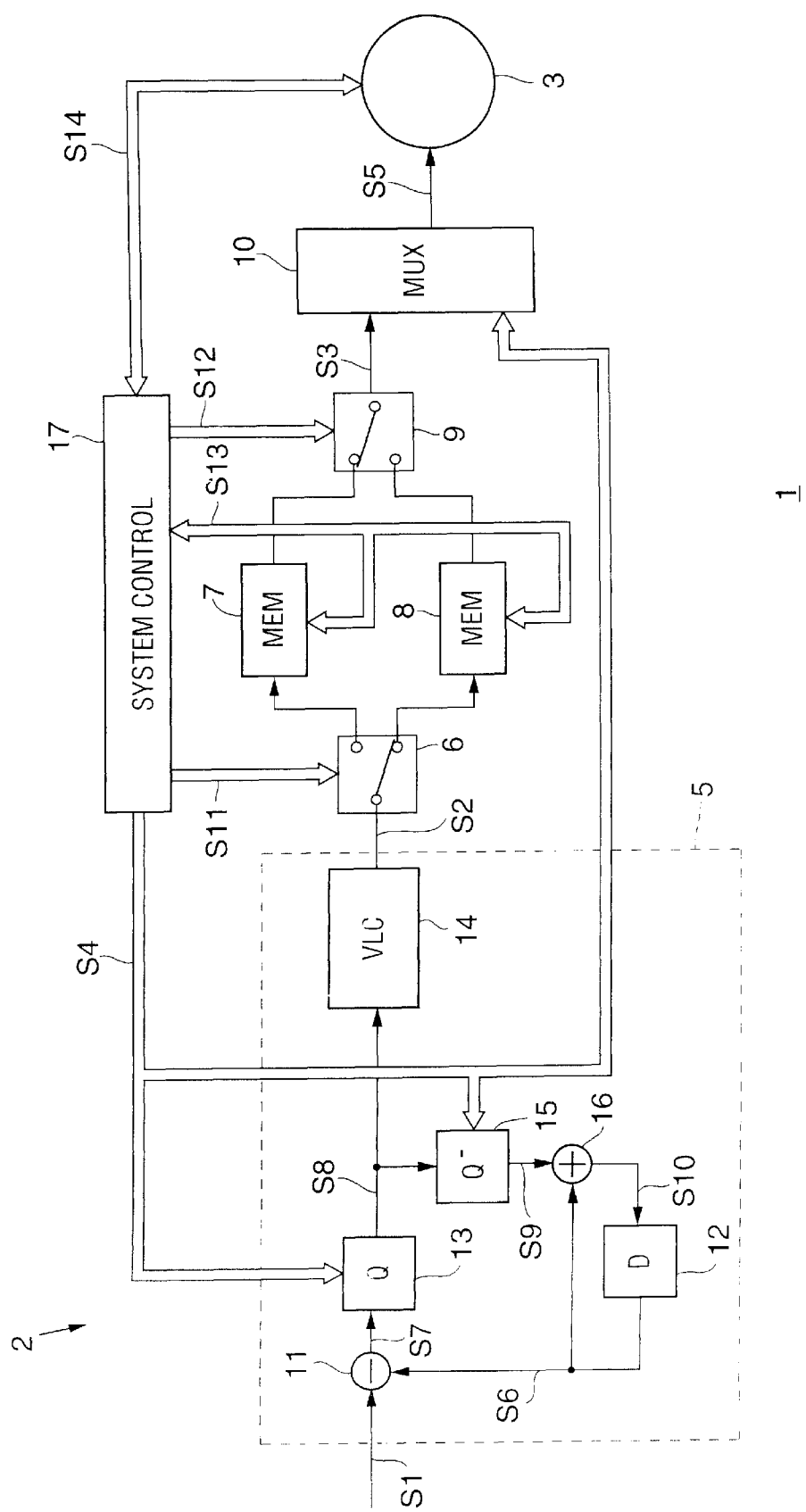
FIG. 1 is a block diagram of an embodiment of a recording device in a data transmission system according to the present invention.
Figure 2:
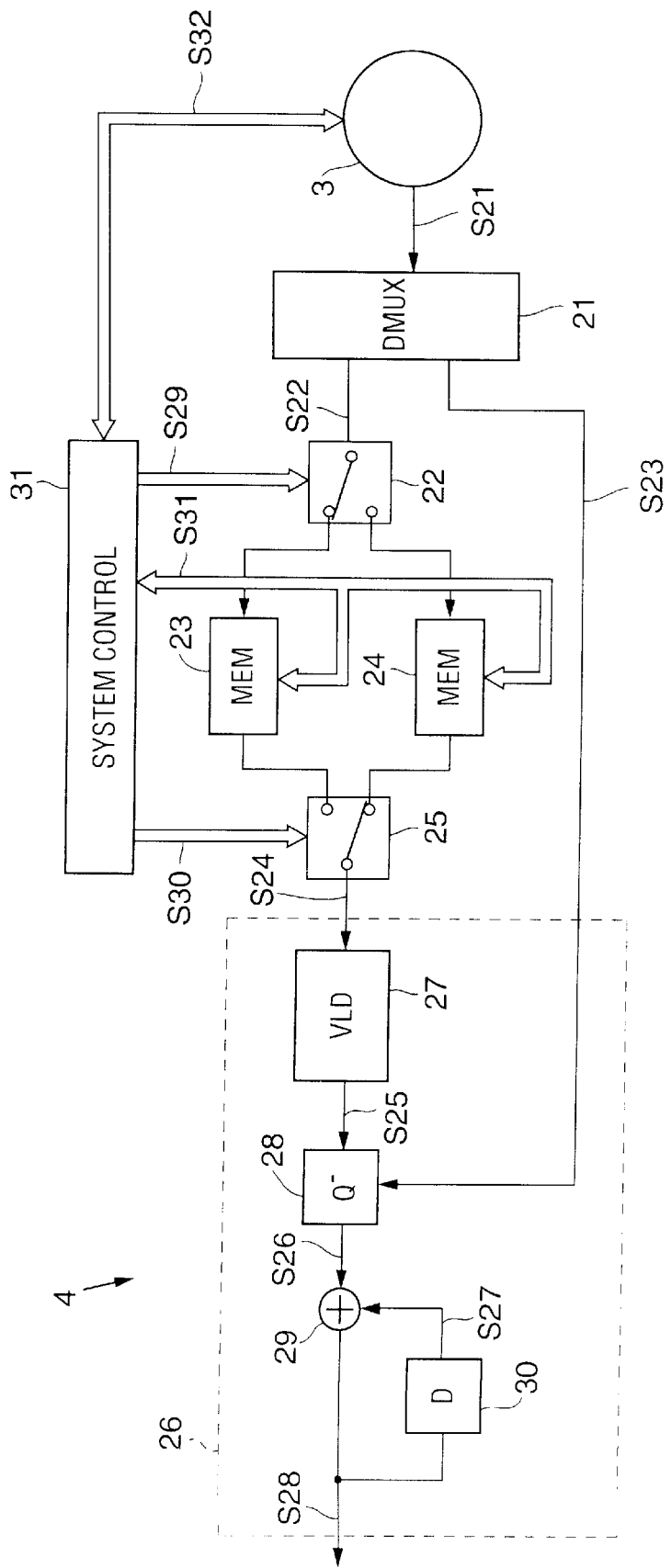
FIG. 2 is a block diagram of an embodiment of a reproduction device in the data transmission apparatus according to the present invention.

Preferred embodiments of this invention will be described with reference to the accompanying drawings:

In FIGS. 1 and 2, 1 generally designates a data transmission system in which picture data recorded on a recording medium 3 by means of a recording device 2 (FIG. 1) is decoded and reproduced by means of a reproduction device 4 (FIG. 2).

The recording device 2 compresses transmission. data S1 which is digital data obtained by converting transmission data by means of a DPCM (differential pulse code modulation) encoding circuit 5, and sequentially stores compressed transmission data S2 in either a digital memory 7 or 8 by means of a switching circuit 6.

The recording device 2 reads out recorded transmission data S3 stored in either the digital memory 7 or 8 by means of a switching circuit 9 at a predetermined transfer speed and supplies it to a multiplexer 10 so that the recorded transmission data S3 and quantization data S4 corresponding to the recorded transmission data S3 can be time-division multiplexed and recorded on a recording medium 3. The DPCM encoding circuit 5 includes a differential data generating circuit 11 which is a subtracter circuit to produce a difference between locally decoded previous data S6 input from a delay circuit 12 and the transmission data S1 and to supply produced differential data S7 to a quantization circuit 13.

The DPCM encoding circuit 5 quantizes the differential data S7 by means of the quantization circuit 13 using a quantization step size determined for each predetermined unit, performs a predetermined variable length encoding process on quantized data S8 by means of a variable length coding circuit 14, and outputs the compressed data as transmission data S2.

The DPCM encoding circuit 5 inverse quantizes the quantized data S8 to a representative value and thereby converts the quantized data S8 into inverse quantized data S9 by means of an inverse quantization circuit 15, and supplies the inverse quantized data S9 to an addition circuit 16.

The addition circuit 16 adds the previously locally decoded data S6 to the inverse quantized data S9 to locally decode the reproduced picture which will be decoded by the reproduction device 4 of FIG. 2, and supplies the data obtained to a delay circuit 12 as locally decoded data S10.

The delay Circuit 12 delays the locally decoded data S10 by a predetermined time and outputs the delayed data to both the differential data generating circuit 11 and the addition circuit 16.

The recording device 2 controls input of the transmission data S2 into the digital memories 7 and 8 and output of the data from the digital memories 7 and 8 by means of a system control circuit 17.

The system control circuit 17, which is a central processing unit, supplies quantization data S4 for determining the quantization size of the transmission data to the multiplexer 10, the quantization circuit 13 and the inverse quantization circuit 15, and supplies change-over signals S11 and S12 to the switching circuits 6 and 9, respectively, to control writing of the transmission data S2 into the digital memories 7 and 8 and reading of the transmission data or S3 from the digital memories 7 and 8.

Also, the system control circuit 17 inputs a memory control signal S13 from the digital memories 7 and 8 and outputs it to the digital memories 7 and 8 to alternately control writing of data S2 into the digital memory 7 (or 8) and reading of data S3 from the digital memory 7 (or 8).

The system control circuit 17 makes either the digital memory 7 (or 8) a writing memory and makes it store the picture data S2 up to its memory capacity, and at the same time makes the other digital memory 8 (or 7) as a reading memory and makes it read out the stored picture data S3 at a predetermined speed, and controls that digital memory 8 (or 7) in the wait state until the storage operation into the writing memory is completed.

Also, the system control circuit 17 inputs a input/output control signal S14 from the recording medium 3 and outputs it to the recording medium 3 to detect the maximum transfer speed required for the picture data S3 to be transferred to the recording medium 3 (which may be 10 Mbit/sec) in this embodiment) and to output a writing enable signal to the recording medium 3.

Also, the system control circuit 17 determines, from the maximum transfer speed, the reference quantity of stored data in the memory (i.e. the quantity of data stored in the digital memory 7 or 8 in sequence which is determined by the maximum transfer speed). The system control circuit 17 compares the obtained reference quantity of stored data with the quantity of data stored, which is detected from the memory control signal S13. When the quantity of stored data detected from S13 is less than the reference quantity of stored data (such as the time interval between $t_0$ and $t_7$ in FIGS. 3A and 3B), the system control circuit 17 controls the constant quantization size to a constant value to maintain the quantity of distortion generated in the transmission data to a fixed value.

Figures 3A, 3B:
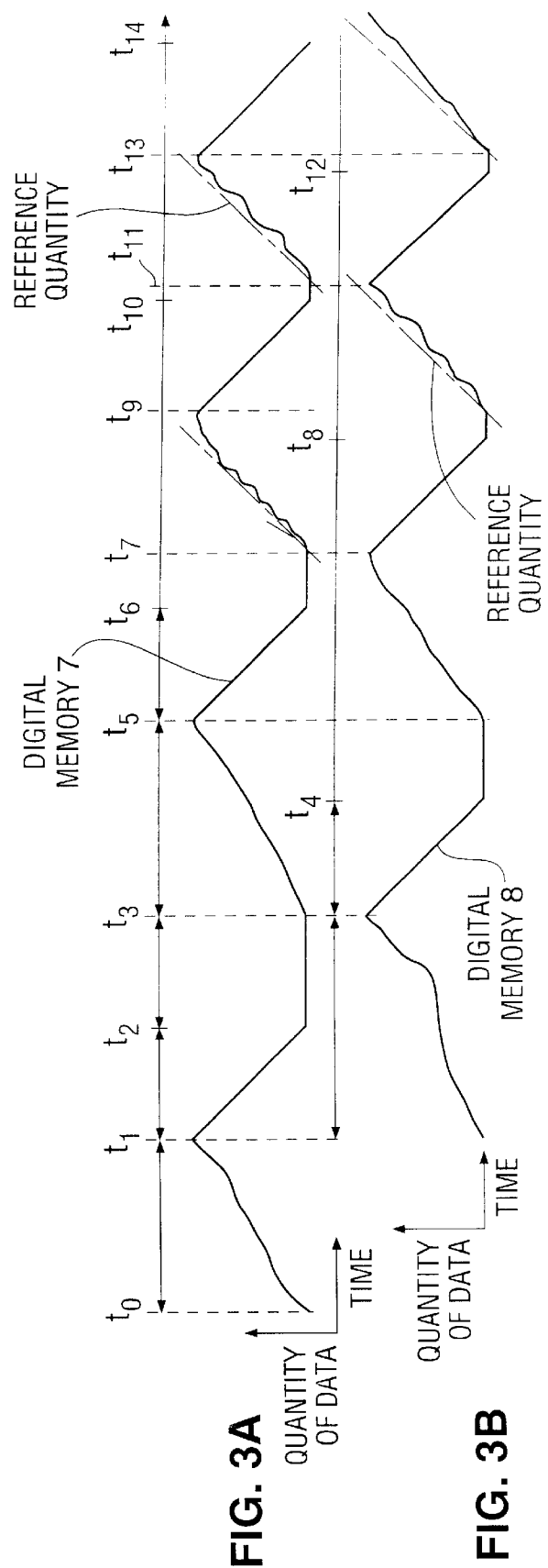
FIGS. 3A and 3B are a time chart illustrating the writing/reading out operation into and from digital memories.

When the quantity of stored data which is detected from the memory control signal S13 is greater than the reference quantity of stored data, the system control circuit 17 controls the quantization size in accordance with the quantity of generated data so as to maintain the quantity of generated data to a substantially fixed value and thereby prevent overflow of the data which is written in the digital memory 7 or 8 (in a time interval between $t_7$ and $t_{14}$ in FIGS. 3A and 3B, for example).

The reproduction device 4 of FIG. 2 separates reproduced data S21 read out from the recording medium 3 into reproduced transmission data S22 and quantization data S23 by means of a demultiplexer 21, and stores the reproduced transmission data S22 in sequence in either the digital memory 23 or 24 by means of a switching circuit 22.

The reproduction device 4 reads out the memory data from either the digital memory 23 or 24 by means of a switching circuit 25 and supplies it to a DPCM decoding circuit 26 to output the transmission data recorded in the recording medium 3 as reproduced data S28.

The DPCM decoding circuit 26 performs decoding on the memory data S24 input to a variable length decoding circuit 27 by the reverse process to that of the variable length coding circuit 14 of FIG. 1 to produce decoded data S25, and supplies it to an inverse quantization circuit 28 to output representative value data S26 using the quantization data S23 separated from S21 by the demultiplexer 21.

Also, the DPCM decoding circuit 26 adds the representative value data S26 input to the addition circuit 29 to decoded data S27 and outputs the reproduced data S28 to an external circuit and to a delay circuit 30.

The reproduction device 4 controls the reading out operation of the reproduced data S21 from the recording medium 3 by means of a system control circuit 31. That is, the system control circuit 31 controls reading of data from the recording medium 3 and determines whether the picture data stored in the recording medium 3 is picture data stored in the fixed distortion transmission mode or in the variable distortion transmission mode to control the quantization size by means of an input-output control signal S32 which is exchanged with the recording medium 3.

Also, the system control circuit 31 outputs change-over signals S29 and S30 to the switching circuits 22 and 25, respectively, and outputs a memory control signal S31 to the digital memory 23 or 24 to control the writing and reading out operations of the reproduced data in accordance with the reading out speed from the digital memory 23 or 24 which corresponds to the maximum transfer speed from the recording medium 3.

In the aforementioned structure, the recording device 2 sequentially compresses the transmission data S1 and thereby converts it into transmission data S2 by means of the DPCM coding circuit 5.

At that time, the system control circuit 17 determines, from the memory control signal S13, whether or not the quantity of data stored in the digital memory 7 or 8 is less than the reference quantity of stored data as determined by the maximum transfer speed to the recording medium 3.

If it is determined that the quantity of data stored into the digital memory 7 (solid line in FIG. 3A) is less than the reference quantity of stored data (time intervals between $t_0$ to $t_1$ and between $t_3$ and $t_5$ in FIG. 3A), the system control circuit 17 quantizes the transmission data S1 using the constant quantization size of the quantization circuit 13, i.e., stores the data into the digital memory 7 at a constant distortion.

During this time, the data stored in the digital, memory 8 (solid line in FIG. 3B) is read out at a predetermined transmission speed and is sent to the recording medium 3 through the switching circuit 9 and the multiplexer 10 and is written in the recording medium 3 while the writing enable signal is supplied from the system control circuit 17 (during the time interval between $t_3$ and $t_4$ in FIG. 3B).

While the writing of the data into the digital memory 7 is in progress, when the reading out of the data stored in the digital memory 8 is completed, the system control circuit 17 places the digital memory 8 in a wait state and suspends the writing operation into the recording medium 3 (during the time interval between $t_4$ and $t_5$ in FIG. 3B).

Similarly, if the system control circuits 17 determines that the quantity of data stored in the digital memory 8 (solid line in FIG. 3B) is less than the reference quantity of stored data (time intervals between $t_1$ and $t_3$ and between $t_5$ and $t_7$), it quantizes the transmission S1 data using the constant quantization size of the quantization circuit 13, i.e., stores the picture data into the digital memory 8 with a constant distortion level.

Also, the system control circuit 17 similarly reads out the data from the other digital memory 7 at a predetermined transmission speed (time intervals between $t_1$ and $t_2$ between $t_5$ and $t_6$ in FIG. 3A). If the writing of the data into the digital memory 8 is in progress when the reading out from the digital memory 7 is completed, the system control circuit 17 places the digital memory 7 in a wait state (time intervals between $t_2$ and $t_3$ and between $t_6$ and $t_7$).

Therefore, the recording device 2 is capable of recording the transmission data S1 at a constant distortion level when the quantity of data generated is within an allowable range.

If the system control circuit 17 determines from the memory control signal S13 that the quantity of data generated will exceed the reference quantity of stored data determined by the maximum transfer speed (which is indicated by the dot-dashed lines in FIGS. 3A and 3B time intervals between $t_7$ and $t_9$, $t_9$ and $t_{11}$, and $t_{11}$ and $t_{13}$, in FIGS. 3A and 3B), it quantizes the transmission data S1 using a variable quantization size supplied to the quantization circuit 13 as signal S4 from system controller 17. The variable quantization size is controlled in accordance with the quantity of data generated, i.e., stores the data in the digital memory 7 or 8 in the variable distortion transmission mode (time intervals between $t_9$ and $t_{11}$ and between $t_{11}$ and $t_{13}$ in FIG. 3A, and time intervals between $t_9$ and $t_{11}$ and between $t_{13}$ and $t_{14}$ in FIG. 3B).

Therefore, when the quantity of data generated S2 increases too much with respect to the transfer speed, the recording device 2 is capable of recording the data in the recording medium 3 without degrading the data transmission, because it quantizes the data using the varied quantization size of the quantization circuit 13, stores the quantized data in either the digital memory 7 or 8 and transfers the data.

The reproduction device 4 determines whether the data read out from the recording medium 3 is that recorded in the constant distortion transmission mode or in the variable distortion transmission mode when it reproduces the data from the recording medium 3.

In the thus-arranged system, the system control circuit 17 determines whether the quantity of data generated S2 to be recorded on the recording medium 3 is too large with respect to the reference quantity of stored data as determined in accordance with the maximum transfer speed, and quantizes the data using the constant quantization size and transmits the data at a substantially constant distortion level when it is determined that the quantity of data generated is less than the reference quantity of stored data while quantizing the data using the variable quantization size which is varied in accordance with the quantity of data generated when it is determined that the quantity of data generated S2 is greater than the reference quantity of stored data. It is thus possible to record data on the recording medium 3 while maintaining the quantity of data at substantially constant levels regardless of the type of data source.

In the aforementioned embodiment, a data transmission system in which the maximum transfer speed is 10 Mbit/sec has been described. However, the present invention is not limited to this embodiment, but may be applied to a data transmission system in which the maximum transfer speed is, for example, 150 Mbit/sec.

In the aforementioned embodiment, the transmission of compressed data, which was picture data or audio data, has been described. However, the present invention is not limited to this compressed data, but may also be applied to the case in which the compression rate is 1, i.e., in which the data is not compressed or does not compress, from the viewpoint of the data source and the transmission ability of the transmission path.

In the aforementioned embodiment, the case in which data is recorded on the recording medium 3 has been described. However, the present invention is not limited to this but it may also be applied to the case in which data is transmitted via a telecommunication line.

In the aforementioned embodiment, the case in which the system control circuit 17 feed-back controls the quantization circuit 13 and thereby changes the quantization size when the quantity of data generated S2 is large has been described. However, the present invention is not limited to this but it may also be applied to the case in which the variable length coding circuit 14 is feedback controlled or both the quantization circuit 13 and the variable length coding circuit 14 are feed-back controlled.

In the aforementioned embodiment, the quantization size has been controlled in accordance with the quantity of data stored in the digital memory 7 or 8. However, the present invention is not limited to this case, but may also be applied to the case in which the quantization size is controlled in accordance with the quantity of data which increases or decreases in a unit time.

While the present invention has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is clamed is:

1. An encoding system for encoding source video data, the system comprising:
    quantizing means for quantizing said source video data in accordance with quantization step size to generate quantized video data;
    encoding means for encoding said quantized video data to output an encoded video stream;
    buffer means for buffering said encoded video stream; and
    controlling means for outputting a control signal to a recording medium to detect a maximum transfer speed of data to the recording medium, for determining from the maximum transfer speed a reference quantity of data stored in said buffer means, for receiving buffer information indicating a data occupancy of said buffer means based on the reference quantity of data stored in said buffer means, and for controlling a value of said quantization step size to be supplied to said quantizing means,
        wherein said control means maintains said value of the quantization step size constant when the data occupancy of said buffer means is less than a threshold level, and varies said value of the quantization step size when the data occupancy of said buffer means is greater than the threshold level so as to prevent overflow of said buffer means.

2. The encoding system for encoding source video data according to claim 1, further comprising: a first and second memory for alternately storing the quantized video data, the quantized video data being written in one of said first and second memory while the quantized video data is read out from another one of the first and second memory and transmitted.

3. An encoding system for encoding source video data, the system comprising:
    quantizing means for quantizing said source video data in accordance with quantization step size to generate quantized video data;
    encoding means for encoding said quantized video data to output an encoded video stream;
    buffer means for buffering said encoded video stream; and
    controlling means for outputting a control signal to a recording medium to detect a maximum transfer speed of data to the recording medium, for determining from the maximum transfer speed a reference quantity of data stored in said buffer means, for receiving buffer information indicating a data occupancy of said buffer means based on the reference quantity of data stored in said buffer means, and for controlling said quantizing means,
        wherein said control means has at least a first mode and a second mode for generating said quantization step size, and selects one mode from said two modes in response to said buffer information, and
        wherein said control means generates a constant quantization step size when the data occupancy of said buffer means is less than a threshold level as said first mode, and generates a variable quantization step size when the data occupancy of said buffer means is greater than the threshold level as said second mode.

4. The encoding system for encoding source video data according to claim 3, further comprising: a first and second memory for alternately storing the quantized video data, the quantized video data being written in one of said first and second memory while the quantized video data is read out from another one of the first and second memory and transmitted.

5. A method for encoding source video data, comprising the steps of:
    quantizing said source video data in accordance with quantization step size to generate quantized video data;
    encoding said quantized video data to output an encoded video stream;
    buffering said encoded video stream; and
    outputting a control signal to a recording medium to detect a maximum transfer speed of data to the recording medium;
    determining from the maximum transfer speed a reference quantity of data stored in a buffer;
    receiving buffer information indicating a data occupancy of said buffer based on the reference quantity of data stored in said buffer means; and
    controlling a value of said quantization step size to be quantized based on said buffer information,
        wherein said step of controlling a value of said quantization step size includes maintaining said value of the quantization step size constant when the data occupancy of said buffer is less than a threshold level, and varying said value of the quantization step size when the data occupancy of said buffer is greater than the threshold level so as to prevent overflow of said buffer.

6. A method for encoding source video data, comprising the steps of:
    quantizing said source video data in accordance with quantization step size to generate quantized video data;
    encoding said quantized video data to output an encoded video stream;
    buffering said encoded video stream;
    outputting a control signal to a recording medium to detect a maximum transfer speed of data to the recording medium;
    determining from the maximum transfer speed a reference quantity of data stored in a buffer;
    receiving buffer information indicating a data occupancy of said buffer based on the reference quantity of data stored in said buffer means; and
    controlling a value of said quantization step size to be quantized based on said buffer information,
        wherein said step of controlling has at least a first mode and a second mode for generating said quantization step size, and selects one mode from said two modes in response to said buffer information, and
        wherein said step of controlling includes generating a constant quantization step size when the data occupancy of said buffer is less than a threshold level as said first mode, and generating a variable quantization step size when the data occupancy of said buffer is greater than the threshold level as said second mode.

* * * * *